(12) United States Patent
Simmons

(10) Patent No.: US 8,906,131 B2
(45) Date of Patent: Dec. 9, 2014

(54) DIRECT PRODUCTION OF IRON SLABS AND NUGGETS FROM ORE WITHOUT PELLETIZING OR BRIQUETTING

(76) Inventor: John J. Simmons, Naples, FL (US)

(*) Notice: Subject to any disclaimer, the term of this patent is extended or adjusted under 35 U.S.C. 154(b) by 92 days.

(21) Appl. No.: 13/450,535

(22) Filed: Apr. 19, 2012

(65) Prior Publication Data

US 2013/0081516 A1  Apr. 4, 2013

Related U.S. Application Data

(60) Provisional application No. 61/543,114, filed on Oct. 4, 2011.

(51) Int. Cl.
  *C21B 13/10* (2006.01)
  *C21B 13/00* (2006.01)

(52) U.S. Cl.
  CPC ............ *C21B 13/0046* (2013.01); *C21B 13/10* (2013.01); *C21B 13/006* (2013.01); *C21B 13/008* (2013.01)
  USPC .................. 75/473; 75/503; 75/504; 420/590

(58) Field of Classification Search
  CPC  C21B 13/0046; C21B 13/006; C21B 13/008; C21B 13/10; C22B 1/14
  USPC .............................. 75/503, 473, 504; 420/590
  See application file for complete search history.

(56) References Cited

U.S. PATENT DOCUMENTS

| | | | | |
|---|---|---|---|---|
| 2,230,322 A | * | 2/1941 | Flannery | 75/503 |
| 2,291,685 A | * | 8/1942 | Brassert | 419/30 |
| 3,547,623 A | * | 12/1970 | Pasquali et al. | 75/752 |
| 4,822,410 A | * | 4/1989 | Matovich | 75/345 |
| 5,069,715 A | | 12/1991 | Reid | |
| 7,413,592 B2 | | 8/2008 | Bleifuss et al. | |
| 7,632,330 B2 | | 12/2009 | Eisele et al. | |
| 7,939,154 B2 | | 5/2011 | Fosnacht et al. | |

(Continued)

FOREIGN PATENT DOCUMENTS

GB        190906529 A  *  0/1910

OTHER PUBLICATIONS

"biomass." McGraw-Hill Encyclopedia of Science and Technology. The McGraw-Hill Companies, Inc., 2005. Answers.com Apr. 5, 2014. http://www.answers.com/topic/biomass.*

(Continued)

*Primary Examiner* — Roy King
*Assistant Examiner* — Tima M McGuthry Banks
(74) *Attorney, Agent, or Firm* — Nikolai & Mersereau, P.A.; C. G. Mersereau

(57) ABSTRACT

Metallic iron is produced from a composition formed from a mixture of iron ore particles and particles of a reductant made of a biomass material, a coal or coke in a particulate form together with a flux and is processed in a loose, un-agglomerated non-pelletized, non-briquetted form in a reducing furnace to produce metallic iron directly from the ore. An excess of biomass or coal or coke reductant can be used to provide CO and H that can be recovered as a synthetic gas and converted to electrical or other energy. Metallic iron nuggets or slabs can be produced from manganiferous ores or concentrates. Manganese can be caused to enter the nugget or slab or the slag by adjusting the furnace temperature. Titaniferous ores or concentrates can be used to produce metallic iron slabs or nuggets and a titanium-rich slag.

29 Claims, 6 Drawing Sheets

(Feed End Linear Furnace with ceramic boat containing loose iron reductant, flux on bed of anthracite coal.)

(56) References Cited

U.S. PATENT DOCUMENTS

2007/0209480 A1* 9/2007 Eisele et al. ............... 75/560
2009/0175753 A1* 7/2009 Iwasaki et al. ............. 420/8
2010/0126311 A1* 5/2010 Hoffman .................... 75/508
2012/0031232 A1* 2/2012 Huang et al. ............. 75/10.13

OTHER PUBLICATIONS

Kobayashi et al, Iron & Steelmaker Publication of the Iron and Steel Society, *A New Process to Produce Iron Directly From Fine Ore and Coal*, vol. 28, No. 9, Sep. 2001, pp. 19-22.

Tsuge et al, Direct From Midrex, *Successful Iron Nuggets Production at ITmk3 Pilot Plant*, Mar. 2002, pp. 511-519.

Anameric et al, Minerals & Metallurgical Processing, *Shrinking-core Model for Pig Iron Nugget Production*, vol. 28, No. 1, Feb. 2011, pp. 24-32.

Anameric et al, ISIJ International, *The Microstructure of the Pig Iron Nuggets*, vol. 47, No. 1, 2007, pp. 53-61.

Anameric et al, Minerals & Metallurgical Processing, *Conditions for Making Direct Reduced Iron, Transition Direct Reduced Iron and Pig Iron Nuggets in a Laboratory Furnace—Temperature-time Transformations*, vol. 24, No. 1, Feb. 2007, pp. 41-50.

Anameric et al, Sohn International Symposium Advanced Processing of Metals and Materials, *Pig Iron Nuggets Versus Blast Furnace Pig Iron*, vol. 5, 2006, pp. 139-156.

* cited by examiner

Plan view of a crucible with loose, unagglomerated iron ore, flux, reductant mixture on a bed of petroleum coke.

Horizontal Section of Figure 1

Plan view of a crucible after removal from high temperature furnace with the metallic iron slab or nugget and slag on a bed of petroleum coke.

Horizontal section of Figure 3

(Note: Photos of ceramic boat containing loose, unagglomerated iron ore, flux, reductant feed stock.)

(Plan view of boat @ loose iron ore, flux, reductant mixture on bed of anthracite coal)

(Horizontal section of Figure 5)

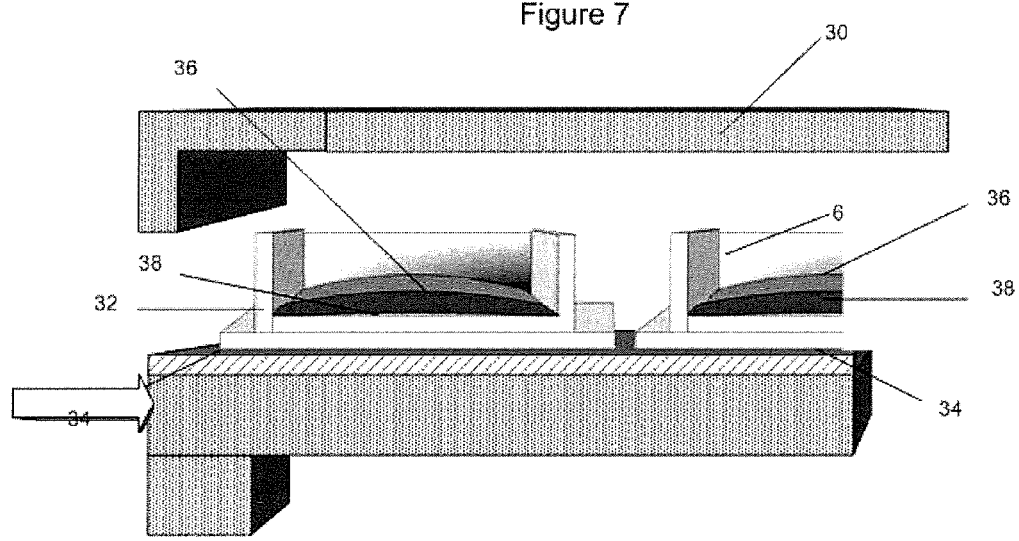
(Feed End Linear Furnace with ceramic boat containing loose iron reductant, flux on bed of anthracite coal.)
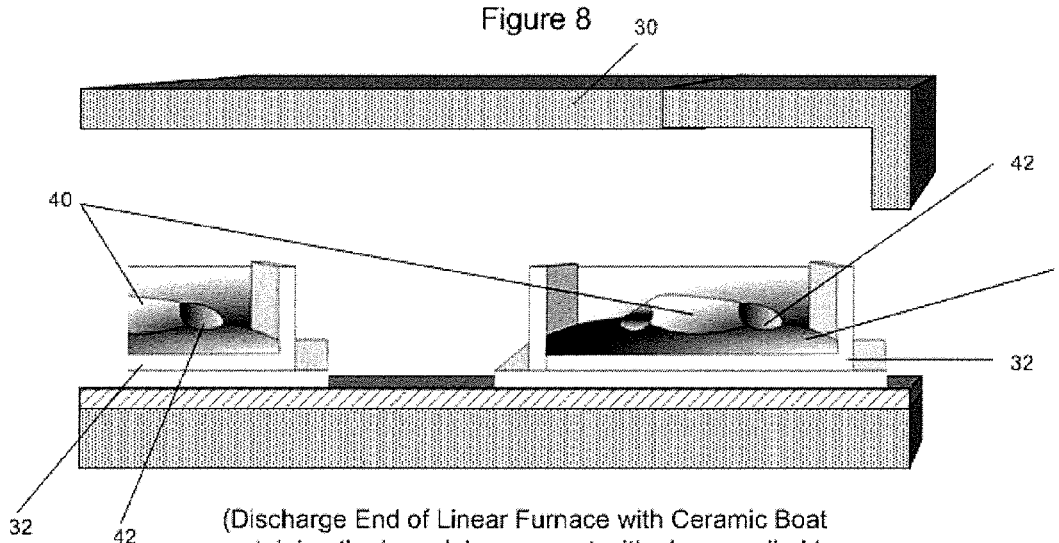
(Discharge End of Linear Furnace with Ceramic Boat containing the iron slab or nugget with slag expelled to either side of the iron slab or nugget.)
(10)

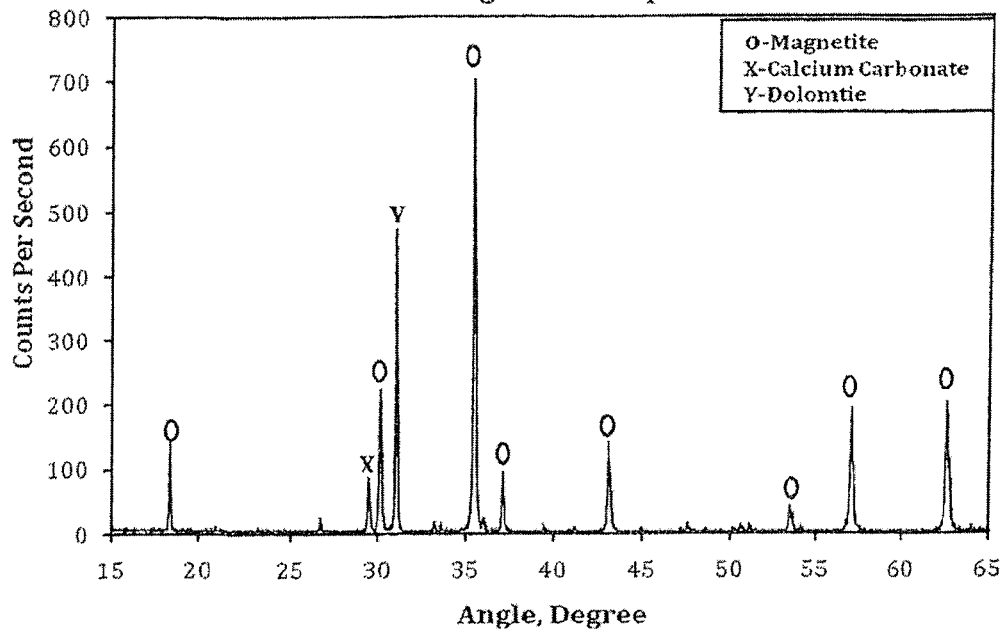
XRD of Magnetite concentrate (as received) representing Magnetic peaks.
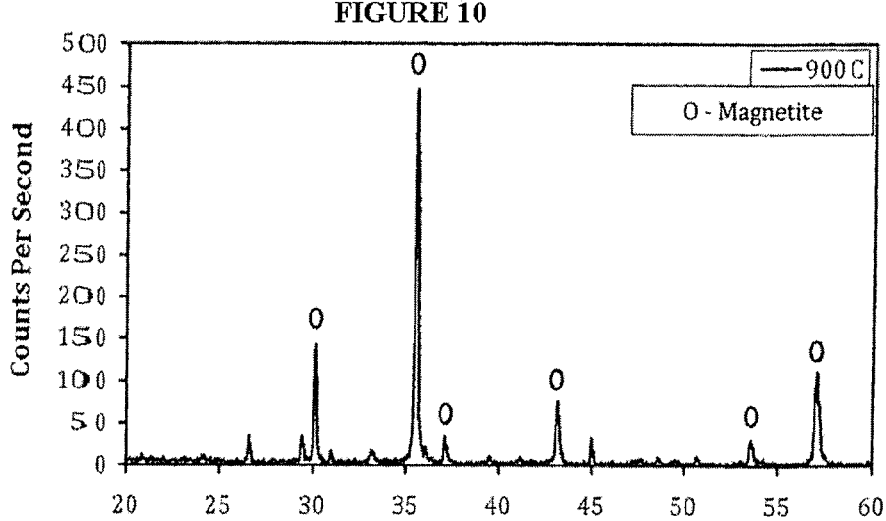
XRD of the biomass pellets composed of 80% magnetite concentrate/18% softwood/ 2% wheat flour and fired at furnace temperature 900° C for residence time 5 minutes.

XRD of the biomass pellets composed of 80% magnetite concentrate/18% softwood/ 2% wheat flour and fire at furnace temperature 1000°C for 30 minutes.

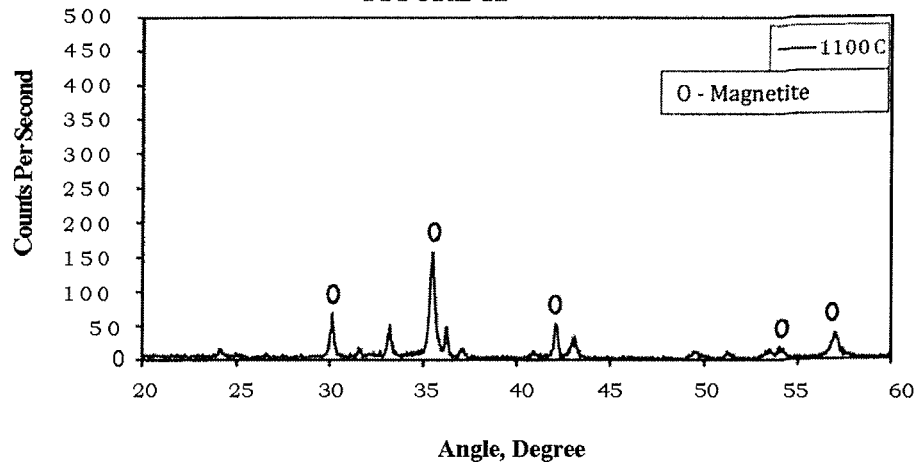
XRD of the biomass pellets composed of 80% magnetite concentrate/18% softwood/2% wheat flour and fired at furnace temperature 1100°C for 30
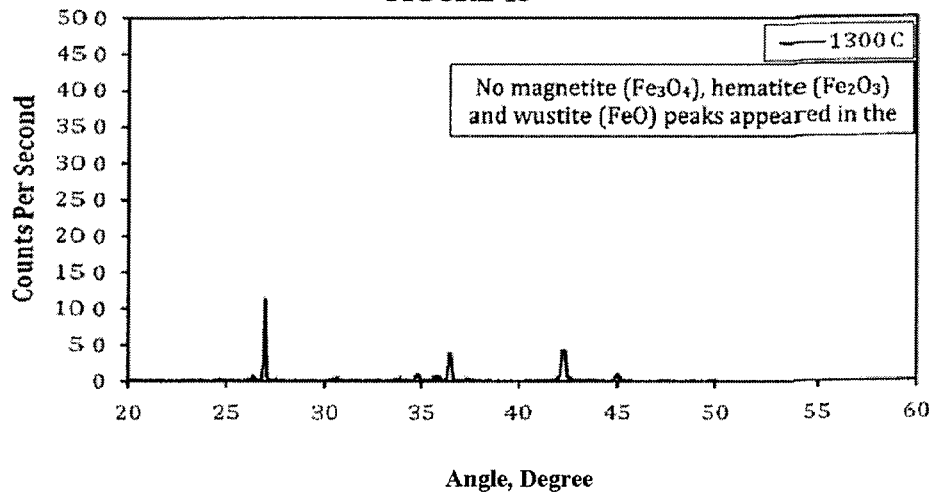
XRD of the biomass pellets composed of 80% magnetite concentrate/18% softwood/2% wheat flour and fired at furnace temperature 1100°C for 30

DIRECT PRODUCTION OF IRON SLABS AND NUGGETS FROM ORE WITHOUT PELLETIZING OR BRIQUETTING

CROSS-REFERENCED TO RELATED APPLICATIONS

This application is a non-provisional application of Application No. 61/543,114, filed Oct. 4, 2011 and claims priority from that application which is also deemed incorporated by reference in its entirety in this application.

STATEMENT REGARDING FEDERALLY SPONSORED RESEARCH OR DEVELOPMENT

Not applicable

BACKGROUND OF THE INVENTION

I. Field of the Invention

The present invention relates generally to the smelting of iron ore or iron oxides and, more particularly, to a composition and method for the production of metallic iron from iron ore without agglomerating the feed stock.

II. Related Art

In the last few years methods have been developed for what is known as direct reduction or direct iron production, also referred to as the production of iron nuggets from iron ore as described for example in the following journal articles:

Anameric B. and Kawatra S. K, Transformation Mechanisms of Self Reducing Fluxing Dried Greenballs into Pig Iron Nuggets, Presented at 2007 SME Annual Meeting, 2007 (c).

Anameric B. and Kawatra S. K., Laboratory Scale Investigations on the Formation of Pig Iron Nuggets, Submitted for publications in *ISIJ International*, January 2007 (b).

Anameric B. and Kawatra S. K., Conditions for Making Direct Reduced Iron, Transition Direct Reduced Iron and Pig Iron Nuggets in a Laboratory Furnace—Temperature Time Transformations, Submitted for publication in Minerals and Metallurgical Processing, May 206 (c), Preprint no MMP-06-027.

Anameric B. and Kawatra S. K., Pig Iron Nuggets Versus Blast Furnace Pig Iron, Presented at TMS Fall Extraction and Processing Meeting. *Proceedings of the Sohn International Symposium*, San Diego, Calif., Vol. 5, 2006 (b), pp. 136-156.

Tsuge O., Kikukuchi S., and Tokuda K., Successful Iron Nugget Production at ITmk3 Pilot Plant, $61^{st}$ *Ironmaking Proceedings,* Nashville, Tenn., 2002.

Kobayashi I., Tanigahi Y. and Uragami A, A New Process to produce Iron Directly From Fine Ore and Coal, *Iron and Steelmaker*, Vol. 28 No. 9, 2001, pp. 19-22.

Eisele, Timothy C. and Kawatra, Surendra Komar, U.S. Pat. No. 7,632,330, Issued Dec. 15, 2009.

All of the above described processes include mixing the iron ore concentrate, reductant and flux and then agglomerating the mixture by pelletizing or briquetting usually with drying, heating or baking prior to placement of the mixture into a furnace.

The current practice of agglomerating the feedstock mixtures prior to being fed to iron nugget making furnaces requires special compacting equipment and binders and adds to the cost, efficiency and complexity of this operation. In addition, current practice either does not produce separately usable excess gases or does not capture and utilize such additional gases produced during the reduction process for electrical generation or other energy or reduction uses. Current practice does not provide a direct reduction process that can smelt manganiferous ores to produce either a manganese containing iron nugget or separately a high iron, low manganese nugget and a manganese rich slag. Current practice does not provide a direct reduction process that can produce a high iron, low titanium iron nugget and a titanium rich slag, using biomass as a reductant from titaniferous ore or concentrates.

In view of these and other deficiencies in the prior art, it is one object of this invention to provide a method to produce iron slabs or nuggets by feeding a mixture of iron ore concentrates or iron oxides, reductant and flux into the reduction furnace in a loose or un-agglomerated, un-pelleted or un-briquetted form, yet enabling the production of high quality, 95-98% iron 1-3% carbon, metallic iron slabs, bars, mini-ingots or nuggets that readily separate from the slag also produced during the reduction process. The capability to produce high quality metallic iron slabs or nuggets without the need to agglomerate the furnace feedstock, greatly reduces the capital and operating cost, by eliminating the pelletizing or briquetting facility, with associated high capital, maintenance, high power requirements and high operating costs. In some cases the product produced directly in accordance with the invention can qualify as a high carbon steel.

Another object is to co-produce a synthetic as ("syngas") during the production of metallic iron slabs or nuggets from ore. The co-production of syngas provides a source of energy that can be converted to electrical energy that can be used in the processing operation. The syngas can also be a source of heat or energy for other uses.

Still another object of this invention is to provide a composition and method for the production of metallic iron that contains an appreciable amount of manganese, or in the alternative, to produce a metallic iron slab or nugget that has a high iron and low manganese content while, at the same time, producing a manganese rich slag. The manganese rich slag can be further processed to produce commercial grade manganese products.

A further object of this invention is to provide a composition and method for the production of metallic iron slabs or nuggets from an ore or concentrate that contains both iron and an appreciable titanium oxide content, while at the same time producing a titanium rich slag.

The invention also provides a new method of producing an iron nugget or slab from a pelletized, briquetted or loose unagglomerated mixture of titaniferous concentrates biomass in a particulate form and flux. The mixture is processed at 1490° C. for fifteen minutes, which allows the viscous titanium rich slag to separate from the iron nugget to produce a slag that separates cleanly from the iron nugget.

Yet another object is to provide a process as described above in which the slag is readily separated from the metallic iron produced.

A further object of this invention is to provide an improved method and composition for the production of metallic iron in a form that can be conveniently handled and shipped, is stable against oxidation and corrosion, is a suitable feedstock for steel making and foundry operations and is able to utilize a wide variety of readily available, raw materials as well as to enjoy other advantages that will be apparent from the following description.

Yet a further object of this invention is to produce directly reduced iron (DRI) from mixture of loose, un-agglomerated iron ore concentrates or iron oxide together with either a biomass or coal or coke reductant, by processing the feedstock for a shorter time period and a lower temperature than that previously required for the production of iron nugget. Another object of this invention is to utilize biomass as a reductant in the place of coal or coke in a briquetted or pelletized form while processing the feedstock at a lower temperature and for a shorter residence time than required to produce a metallic iron nugget.

These and other more detailed and specific objects of the invention will be apparent from consideration of the accompanying specification claims and drawings which illustrate by way of example but a few of the various ways in which the invention can be accomplished within the scope of the appended claims.

SUMMARY OF THE INVENTION

The present invention provides a new method that makes possible the production of iron slabs and nuggets, without agglomeration, pelletizing or briquetting the furnace feedstock material, with the co-production of synthetic gas (syngas) which reduces both plant capital and operating costs while producing a high quality metallic iron slab or nugget.

The direct production of metallic iron from its ore which employs a method or methods that eliminate the need to pelletize, briquette or otherwise agglomerate a mixture of iron ore particles, reductant and flux prior to placement in a reduction furnace is an important aspect of the present development. While prior technologies agglomerate the feedstock mixtures prior to being fed into the furnace, and which has been adapted as a universal requirement, the present invention not only eliminates the need for agglomeration but produces meaningful advantages during the reduction process and also produces a more desirable finished product. Whereas the size of the metallic iron nugget produced by processes that require pelletizing or briquetting is dependent on the size of the feed pellets or briquettes, which are normally sized at ½ inch to ¾ inch, bodies this size produces metallic iron nuggets that are nominally 50% smaller, ranging from ¼ inch to ½ inch or less in size.

By contrast, the present process allows for a loose, un-agglomerated feed stock that can be placed in the furnace at any desired reasonable size, i.e. such as a blend of material measuring 1 to 3 inches high, 3 inches wide and 6 inches or more in length. The resulting product resembles a metallic iron slab, bar or mini-ingot as opposed to a nugget, with the slag generally forming in the middle of or at one or both ends of the iron slab. The red hot iron slab or mini-ingot, with slag attached is discharged into cold water, which causes thermal shock, further embrittling the slag, which allows for ease of removal by tumbling prior to magnetically separating the magnetic iron slab from the non-magnetic slag.

Another aspect of the invention is to provide for the co-production of synthetic gas during iron ore reduction by utilizing an excess of reductant in the mixture. In accordance with this aspect of the invention, a combustible synthetically produced gas generated during the reduction is collected for further use, e.g., to provide part of the thermal energy used by the furnace in the reduction process or burned for producing electrical power. Gas production was especially noted during the production of metallic iron slabs from a loose, un-agglomerated mixture that contained wood biomass as the reductant. The excess gas produced during pilot plant testing of the process contained more than 280 BTU's per standard cubic foot (SCF) when corrected to remove oxygen and nitrogen. The syngas that was produced, after the oxygen and nitrogen correction contained more than 47% hydrogen and 40% Carbon monoxide, making it a suitable fuel that can be converted to be used as fuel to heat the ore and/or smelting furnace or to provide electrical energy with the use of a syngas fueled engine/generator or steam powered generator.

The present invention provides a new method of producing directly reduced iron (DRI) from a loose, un-briquetted or un-pelletized mixture of iron ore concentrates and particles of a reductant, either in the form of biomass in particulate form or coal or coke in a particulate form with no flux or binder. The mass is processed in a loose, un-agglomerated form at a temperature of 1100-1300° C., which is lower than the temperature of 1350-1490° C. previously required to produce an iron nugget, and for a residence time of 4 to 8 minutes.

The invention further provides a new method of smelting an iron ore containing manganese whereby the process can be so controlled that the manganese can be absorbed into the metallic iron to form an iron/manganese alloy or in the alternative under different temperature conditions, be absorbed into the slag, thereby providing as manganese rich slag as a feedstock for the production of manganese oxides or metal.

The invention further provides a new method of causing a clean separation of the slag from the iron slab or nugget by immersing the combined iron nugget or slab as it exits the hot furnace into cold water. The thermal shock produces a clean slag-free iron slab or nugget and an iron free slag.

The method to cleanly separate the iron nugget or iron slab from the attached slag is an important aspect, as previous art requires a slow cooling process carried out in an inert atmosphere to prevent the re-oxidation of the iron nugget. The method of immersing the newly formed hot iron nugget or slab with attached slag into cold water, causes the slag to break cleanly from the iron nugget or slab, and eliminates the requirement to cool the furnace products in a controlled, inert atmosphere.

The invention also provides a new method of producing directly reduced iron (DRI) from a briquetted or pelletized mixture of iron ore concentrates, biomass in particulate form, and a binder, without the use of coal, coke, or flux. The briquettes or pellets are processed at a temperature of 1100 to 1200° C. The resultant DRI is separated from the associated gangue by magnetic separation.

Another aspect of the invention is to provide a method that will process a manganiferous iron ore to produce either a manganese rich metallic iron slab or nugget or a manganese rich slag, by adjusting the furnace operating temperatures. This will provide a value added product from manganese bearing iron ores or ores that are difficult to market or have no market due to their low grade. Minnesota's Cuyuna iron range, located in Crow Wing County, contains large quantities of lean manganiferous ore in lean ore stockpiles, tailing ponds and in ore deposits that contain appreciable amounts of both iron and manganese combined in a single ore. The present invention provides a method to convert concentrates obtained from the lean ore stockpiles, tailing ponds, and ore deposits into a high quality merchantable metallic iron-manganese product suitable for steel making operations.

A further aspect of the invention is to provide a method that will process a titaniferous iron ore or concentrate to produce a low titanium iron slab or nugget and a titanium rich slag by adjusting the time of reduction in the furnace and the furnace operating temperature. This will provide a high quality iron slab, that may also contain valuable recoverable vanadium from titanium bearing ores or beach sands that are normally difficult to process. Titanium in an iron ore causes a very viscous slag making it unsuitable for the blast furnace. The present invention provides a method to convert titaniferous iron ores or titaniferous beach sand concentrates into a high quality merchantable metallic iron product suitable for steel making operations. The invention also provides a source of vanadium, that is present in many titaniferous ores and titaniferous beach sand concentrates and follows the iron into the iron slab or nugget, where it can be recovered as a valuable bi-product.

Further features of the invention will be described in more detail in connection with the accompanying figures and following specifications describing the invention by way of example.

BRIEF DESCRIPTION OF THE DRAWINGS

In the drawings, wherein like numerals are used to depict like parts throughout the same:

FIG. 7 is a partially blown apart schematic sectional side elevational view of the feed end of the linear furnace with a ceramic boat containing loose iron ore, reductant, and flux on a bed of anthracite coal;

FIG. 8 is a view similar to FIG. 7 showing the discharge end of the linear furnace with the ceramic boat containing an iron slab or nugget with slag sloughed or expelled to either side thereof;

FIG. 9 is an X-ray diffraction (XRD) pattern of a magnetic sample;

FIG. 10 is an X-ray diffraction (XRD) pattern of biomass pellets composed of 80% magnetite concentrate, 18% softwood and 2% wheat flour fired in a furnace at a furnace temperature of 900° C. for a residence time of 5 minutes;

FIG. 12 is an X-ray diffraction (XRD) pattern of biomass pellets of the same composition as those depicted in FIG. 10, fired at a furnace temperature of 1,100° C. for 30 minutes;

FIG. 13 is an X-ray diffraction (XRD) pattern of biomass pellets of the same composition as those depicted in FIG. 10, fired at a furnace temperature of 1,300° C. for 4 minutes.

DETAILED DESCRIPTION

Figure 1:
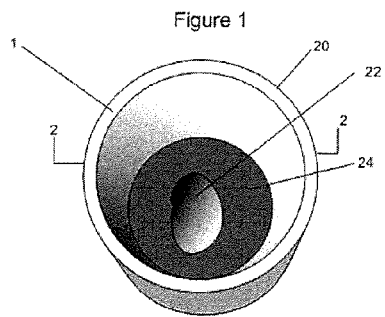
FIG. 1 is a schematic top perspective view of a clay graphite crucible containing a loose mixture, of iron ore concentrate, wood reductant and limestone/dolomite flux on a bed of petroleum coke.
Figure 2:
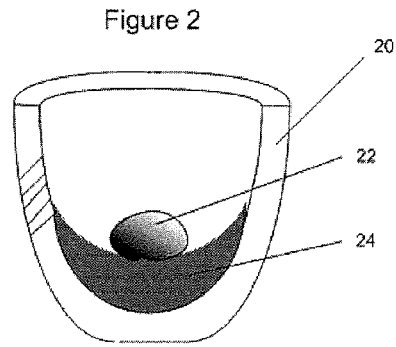
FIG. 2 is a horizontal sectional view through the crucible of FIG. 1.

The following material details a description of one or more embodiments of the present invention but is not meant to limit the scope of the inventive concepts in any manner as variations may occur to those skilled in the art that are well within the confines of the inventive concepts. FIGS. 1-4 illustrate a clay graphite crucible 20 as shown in FIGS. 1 and 2, the crucible contains a loose mixture of iron ore concentrate, wood reductant and limestone/dolomite flux indicated by 22, on a bed of petroleum coke 24. FIG. 2 is a horizontal sectional view through the crucible of FIG. 1.

To be heated the crucible 20 is placed in a furnace, such as, for example, a Thermolyne Model F46128CM high temperature electrically heated furnace and, in the illustrated example, is heated to a temperature of 1490° C. for a residence time of 10 minutes. The crucible is then removed from the furnace and cooled.

Figure 3:
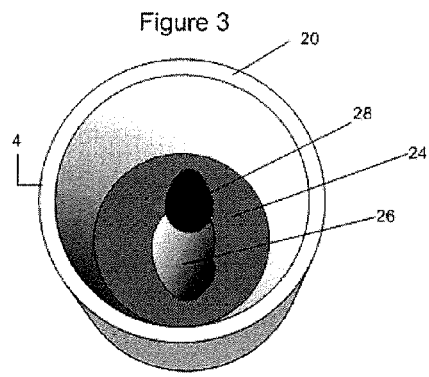
FIG. 3 is a further schematic top perspective view of the crucible of FIGS. 1 and 2 after removal from a high temperature furnace.
Figure 4:
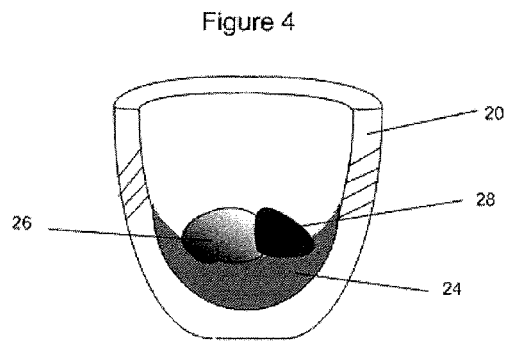
FIG. 4 is a horizontal sectional view through the crucible of FIG. 3.

FIG. 3 shows crucible 20, after removal from the high temperature furnace. Crucible 20 then contains an iron slab 26 on the bed of petroleum coke 24 with slag 28 protruding from one end of the iron slab 26. FIG. 4 is a horizontal section through FIG. 3 showing the slag 28 displaced from the iron slab 26.

Figure 5:
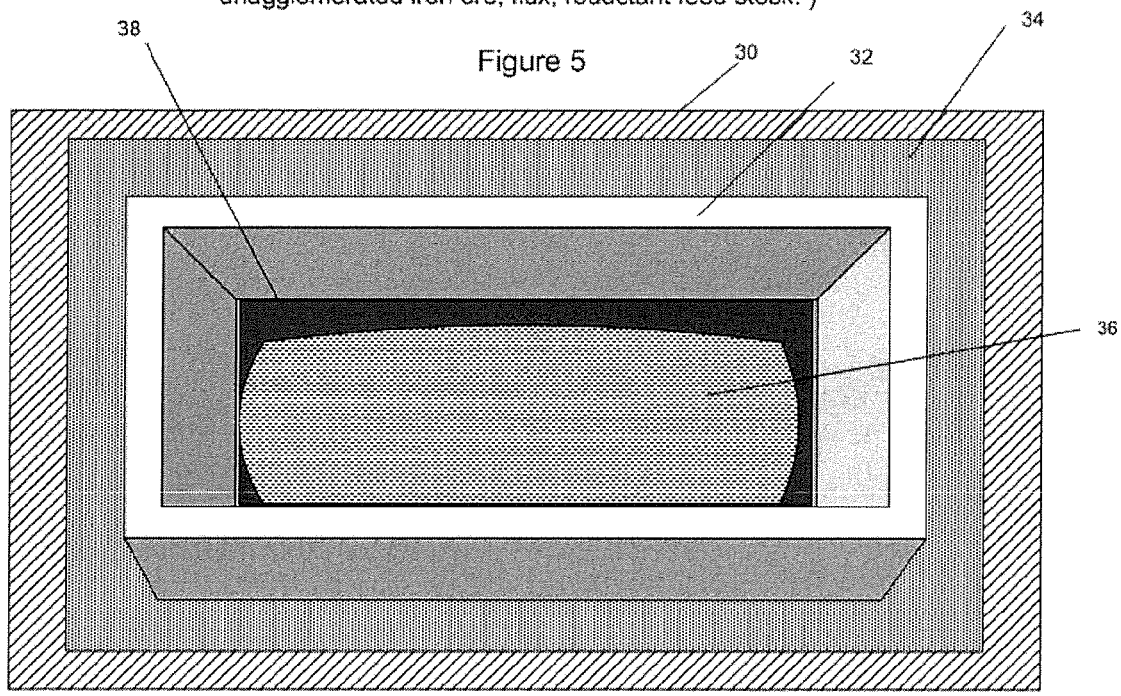
FIG. 5 shows a ceramic boat containing loose unagglomerated iron ore, limestone/dolomite flux, reductant feedstock.
Figure 6:
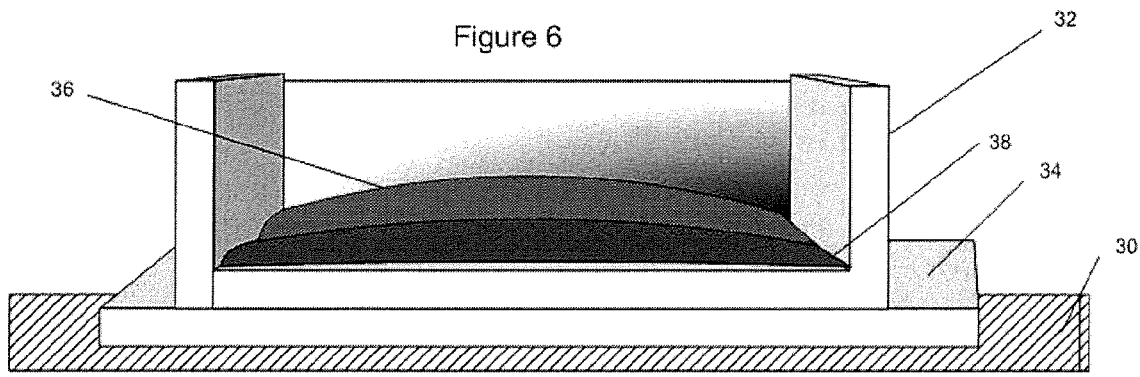
FIG. 6 is a horizontal sectional view through the ceramic boat of FIG. 5.
Figure 11:
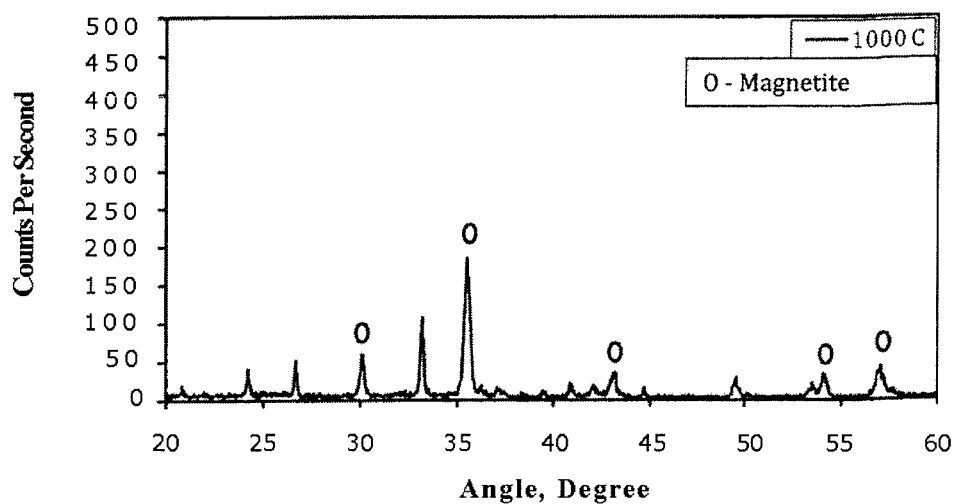
FIG. 11 is an X-ray diffraction (XRD) pattern of biomass pellets of the same composition as those depicted in FIG. 10, fired at a furnace temperature of 1,000° C. for 30 minutes.

FIG. 5 depicts a furnace 30, a ceramic boat 32, designed to be pushed across the furnace 30 on a ceramic plate 34. A mixture of loose un-briquetted material 36, containing a blend of iron ore concentrates, wood biomass or coal reductant, and limestone/dolomite flux is placed on a bed of anthracite coal 38 in the ceramic boat 32. The ceramic boat 32 containing the mixture 36 is pushed through a heating zone of the furnace 30 for a period of 4 to 8 minutes and directly into a high temperature, 1350 to 1550° C., preferably 1490° C. reduction zone. The nominal residence time in the reduction zone is from 5 to 15 minutes, depending on the particle size of the raw materials, but generally 10 to 12 minutes. FIG. 6 is a horizontal section through FIG. 5.

FIG. 7 shows a cross sectional view of the feed end of the furnace 30 with the feed mixture 36 sitting on a bed of anthracite coal 38 in the ceramic boat 32, as it is pushed or otherwise moved into the feed end of the reduction furnace 30.

FIG. 8 is a cross section of the discharge end of the reduction furnace 30 with ceramic boat 32 containing an iron slab or nugget 40 formed in the reduction zone on the anthracite coal 38 together with slag 42, which is expelled to the outside surface of the metallic iron slab or nugget.

The iron oxide used as the feedstock or starting material, typically a natural iron ore, taconite iron ore concentrate, or a concentrate produced from lean ore containing magnetite, hematite, limonite, siderite and/or goethite can be used in any suitable commercial particulate form, preferably in the form of fine particles. While particles as large as 4 mesh in diameter or larger could be used, processing times would be unnecessarily long and such particles would not lend themselves to the complete reduction desired. Therefore, it is preferred that small particles be used, the most preferred being particles that are finely ground. As used herein, finely ground means particles of which more than 90% would pass a 60 mesh screen and preferably 90% passing a 100 mesh screen and most preferably 90% passing a 200 mesh screen.

Other particulate iron oxides or iron oxide ores can be used in the particle sizes that are commercially available. The use of finely ground particles produces yields and processing times that can be optimized and the ore is well adapted to be well mixed with the reductants and fluxes that are introduced to the fine iron ore particles to provide a uniform mix. Generally speaking, the finer the iron ore particles in the loose, un-agglomerated mix, the faster the process time. It is not necessary to use a binder, as required for pelletizing or briquetting by other technologies, as it is preferable to process the iron ore mixture in a loose, un-agglomerated form.

To begin the process according to the present invention, the iron oxide particles are mixed with a reductant that can be a biomass that is substantially devoid of free carbon, such as a woody material, sugar beet waste or switch grass or, if desired, carbonaceous materials including coal, coke or charcoal that contain a high quantity of free carbon may be used.

The biomass reductant may be selected from a wide range of organic materials available throughout the world such as bagasse and copra or materials as suggested in U.S. Pat. No. 7,632,330 B2. The biomass may be a material, non-charred, non-terrified product containing from about 2% to about 30% moisture. That patent also describes the use of plastic resinous material and mixtures thereof as a reductant. Such materials can also be used in the process of the present invention as a reductant, but in the present process it is in the form of a mixture that is fed in an un-agglomerated state into the smelting furnace, rather than in the form of pellets or briquettes.

As indicated, a coal (anthracite, bituminous, sub-bituminous lignite, etc.), or coke or wood char reductant can also be used as a reductant in the un-agglomerated mixture, or as a bedding material placed beneath the mixture prior to the mixture being fed into the furnace in an un-agglomerated form.

The feed stock entering the furnace can be described generally as an uncompacted loose material. In other words the feed stock is substantially free of pellets, briquettes, lumps or other discrete bodies used in previous processes for the direct production of free iron. Likewise, the apparatus used to carry out the invention is simplified and eliminates the need for equipment used for the formation of pellets, briquettes, lumps, or other separate pieces or bodies as feedstock for the furnace. In a typical application, the feed stock can comprise any suitable iron ore concentrate in particulate form together with a reductant such as finely divided woodchips and a flux to react with the silica and alumina to form a slag which separates from the resulting free iron. In the furnace, the slag oozes out of the iron and solidifies upon cooling. It is easily removed by impacting the material in a tumbling mill. Rapidly chilling the iron slab with slag attached, makes the slag brittle which causes the slab to break cleanly from the iron slab when placed in a tumbling mill. The resulting iron pieces usually assay close to 98% iron and 1% carbon which is much higher than the 94-96% iron and 2-2.5% carbon produced in previous direct iron reduction.

The terms "non-agglomerated or "un-agglomerated" and "loose material" with reference to the present specification and claims is intended to mean, material characterized by an absence of cohesion or adhesion between individual particles that comprise the feed stock such that the particles can be separated from one another with little or no tendency to remain in contact. While discrete pellets, briquettes, or pieces are not formed in accordance with the invention, it is, however, within the scope of the terms "non-agglomerated" and "loose material" and the following claims to tamp down the ore and reductant admixture feed stock, for example, as the loose material is placed on the anthracite bed as it is entering a furnace since applying pressure, for example, by means of a roller or tamping platen, would not produce sufficient compaction to provide any significant degree of bonding (either adhesion or cohesion) or create self-supporting bodies.

A flux described above, preferably comprising, but not limited to, a blend of limestone and dolomite such as 50% limestone and 50% dolomite is also added to the mixture of iron ore concentrates and reductant. The flux reacts with the silica and alumina in the iron ore concentrates to form a slag that separates from the metallic iron slab or nugget during the reduction process. Any other flux material suitable for use in the process can also be used. It has been discovered, for example, that burnt lime is also a satisfactory fluxing material. Although more costly than limestone/dolomite, its use in the process requires less heat.

The ore, reductant and flux are weighed, and thoroughly mixed in a mixer of any suitable commercially available type such as a drum mixer, Lightnin® mixer mixing screw or kneader mixer. The mixed product is then fed to a dryer at a temperature of 105° C. or slightly above. The dryer can be a separate unit or may be an integral part of the reduction furnace.

The bulk density of the dried feed stock will, of course, vary depending upon the character of the ore being processed so that an ore of 65% iron will, of course, have a greater bulk density than one that is 60% iron. Since there are no large air spaces of the kind that are present between pellets, briquettes or other self-supporting pieces previously used in direct iron production, the bulk density is in proportion to the voids that are eliminated through the practice of the present invention. While the use of a loose material eliminates the voids between each individual briquette or pellet, the individual briquette or pellet is more dense and has less voids than the loose material. The voids in the loose material allows the reducing gases formed during the reduction process to better react with the iron oxide particles which can favorably impact the reduction process.

The furnace can be heated in any well known manner independently of the charge of material placed in the furnace, for example by the burning of a solid, liquid or gaseous fuel such as natural gas, coal, wood, propane, fuel oil either directly or indirectly or can be heated electrically with electrical resistance heaters. Heating the furnace indirectly will allow for the production of synthetic gas from the use of an excess of reductant in the reduction process that is less contaminated then when produced with direct fired fuels. One suitable furnace is a linear furnace such as a high temperature CM Furnace, Model 10-0008-19B, 24 feet long (heat and cool), a high temperature electrically heated furnace. This furnace has a series of electrically heated molybdenum heating elements to provide the heat and thermocouples to sense temperatures for control of the heat in the heating, reduction and cooling zones.

Any of a variety of commercial furnaces may be used including rotary grate straight grate, linear car furnace, linear pusher furnace and similar types of furnaces.

During the reduction process, which may be accomplished in as little as five minutes, the reductant and flux contained in the loose, un-agglomerated mixture decomposes and it is the products of decomposition of the reductant materials that reduce the iron oxide to metallic iron. As the iron melts, the impurities are expelled from the melt as a slag product leaving one or more droplets of metallic iron that frequently fuse or coalesce and upon cooling solidify as slabs, bars, pieces, mini-ingots or nuggets of metallic iron suitable for use in steel making. During the smelting process, the metallic iron absorbs excess carbon from the reductant which becomes incorporated into the iron allowing it to melt at a lower temperature of about 1200° C. rather than the melting temperature of pure iron which melts at about 1540° C.

The flux, such as the above mentioned limestone/dolomite or burnt lime contains calcium carbonates or calcium oxide that reacts with the silica and alumina in the iron ore or iron ore concentrate. The flux also improves the melting and slag separation from the metallic iron.

The finished metallic iron slab, bar or nugget with the attached slag is further processed in a tumbler or grinding mill and a magnetic separator of any well known commercially available kind to separate the slag and collect the metallic iron. Discharging the hot iron slab, bar or nugget with slag attached into a cold water bath, causes the slag to become brittle and break cleanly from the iron slab, bar or nugget.

It can be readily seen from the above description that the invention has the advantages of using either reducing agents that include renewable and recyclable organics or carbon based reductants (coal, coke, etc.) that are mixed with iron oxides and flux and fed into a smelting furnace. The size of iron nuggets previously produced using pellets or briquettes is controlled by the size of the feedstock pellet or briquette, which are normally in the ½ to ¾ inch size range; whereas it has been found that the iron nuggets produced using "loose, un-agglomerated feedstock, can be much larger in size, depending on the shape and the amount of loose material delivered to the furnace refractory bed. Iron nuggets, slabs or bars measuring 2 inches wide by 4 inches long by ¾ inch thick have been produced with loose un-agglomerated material.

The carbon content of most steel is in the range of 0.08%-0.55%. However, SAE No. 1095 steel has a carbon content of 0.9%-1.03%. Importantly, using finely divided iron ore, the process of the present invention is capable of directly producing steel with a carbon content as low as 1% which can be used without reducing the carbon content to form products such as wrought, stainless, martensitic, chromium steel, for example, SAE No. 51440 steel which is allowed by specifications to have a carbon content up to 1.20%. The invention is therefore capable of directly producing steel, as distinguished from pig iron previously produced by using pellets or briquettes as feed stock, and this, can be accomplished by the present invention in a single step in as little as five minutes.

All references cited herein are incorporated by reference to the same extent they would be if reproduced in full within the text of the present application.

The invention will be better understood by reference to the following examples:

EXAMPLE 1

A fluxed (limestone/dolomite) iron ore concentrate from the Minorca mine, Hibbing, Minn., consisting of particles 90% passing a 25 micrometer screen and consisting of 65% iron and 4.5% silica before fluxing, was mixed with 60×0 mesh dried, ground hard wood. No binder was added. The fluxed iron concentrate and ground wood were weighed and mixed together in a kneader-mixer with no moisture added. The loose, un-agglomerated mixture contained about 70% concentrate and 30% wood reductant. The loose mixture was placed in a claygraphite, oxide crucible as shown in FIGS. 1 and 2 containing a refractory supporting base consisting of petroleum coke which held and supported the loose mixture. The loose material was fired at a temperature of 1490° C. for 10 minutes. After cooling, the metallic iron slab that was produced was easily separated from the adhering slag. The metallic iron slab had an apparent density (gm/cm$^3$) of 7.41. The results of this test are contained in Table No. 1.

Metallic iron nuggets or slabs with an apparent density of 7.0 or higher have an iron assay above 92%.

EXAMPLE 2

Metallic iron was produced from fluxed magnetite concentrates as in Example 1, except that 60×0 mesh dried softwood was used as the reductant in place of the hardwood. The loose material was fired for 10 minutes at 1490° C. The metallic iron slab that was produced after being separated from the slag had an apparent density (gm/cm$^3$) of 7.32. The results of this test are contained in Table No. 2.

EXAMPLE 3

Metallic iron was produced from fluxed magnetite concentrate that assayed 65% iron 4.5% silica before fluxing, mixed with dried sugar beet waste as the reductant. The mixed blend was placed on a bed of petroleum coke in the furnace in the form of a loose powder. The sample was fired at a temperature of 1490° C. for a residence time of 10 minutes. A metallic iron slab was produced with an apparent density of 6.67 (gm/cm$^3$). The results of this test are contained in Table No. 3.

EXAMPLE 4

Metallic iron was produced from a lower grade of iron ore concentrate that assayed 58% iron, 13% silica. A limestone/dolomite flux and hardwood reductant, were added to the iron ore concentrate. The products were mixed in a kneader blender. The mixture was placed in a crucible on a bed of petcoke as a "loose", un-agglomerated powder. The sample was fired at 1490° C. for a residence time of 10 minutes. A metallic iron slab was produced with an apparent density of 7.12. The results of this test are contained in Table No. 4.

EXAMPLE 5

Metallic iron was produced from a titaniferous beach sand concentrate that assayed 59.30% iron, 7.90% $T_1O_2$, 1.90% $S_1O_2$, 2.80% MgO, 3.52% $Al_2O_3$, 0.04% CaO and 0.48% $V_2O_3$. The concentrate was mixed with 14.8%, 40×0 mesh hardwood and 11.1% lime (burnt) and fed as a loose, blended mixture placed on an anthracite bed, into a clay-graphite crucible for furnace treatment. The crucible containing the above materials was placed in a furnace at a temperature of 1490° C. for 12 minutes. The product was a combination of an extremely thick and viscous slag together with metallic iron that produced a porous sponge mass and the slag would not separate from the iron.

EXAMPLE 6

The blend of titaniferous beach sand concentrate, reductant and flux, described in Example 5 was placed on a bed of anthracite coal in a clay-graphite crucible. The crucible was placed in the furnace at a temperature of 1490° C. but the time was extended to 15 minutes. The additional time allowed the slag to migrate to and be expelled to the edge of the iron slab. The product was an iron metal slab with slag separated from the iron and expelled to one side of the slab. The red hot slab/slag product was dropped in water. Thermal shock broke most of the slag free from the metal. Without the aid of the thermal shock provided by the cold water, slag removal would have required hammering as the metal slab was jagged and irregularly shaped. The surface of the metal was clean and nearly white, rather than being coated with a grey oxide.

As indicated, the following Table Nos. 1-6 describe the results of producing metallic iron slabs or nuggets using hardwood, softwood and dried sugar beet waste as the reductant, at a temperature of 1490° C. and a residence time of 10 minutes.

The column marked weight of loose mixture (gms) is the total weight of the blended "loose" mixture including the iron ore, reductant and flux.

TABLE 1

Experimental Conditions: 1490° C. at 10 minute residence time

| | Weight-Grams | | | |
|---|---|---|---|---|
| Feedstock | Loose Powder | Metallic Slab | Slag | Metallic Slab density g/cm$^3$ |
| 65% Fe Fluxed Concentrate, Reductant hardwood | 12 | 6.05 | 1.10 | 7.41 |

TABLE 2

Experimental Conditions: 1490° C. at 10 minute residence time

| Feedstock | Weight-Grams | | | Metallic Slab density g/cm³ |
|---|---|---|---|---|
| | Loose Powder | Metallic Slab | Slag | |
| 65% Fe Fluxed Concentrate, Softwood Reductant | 12 | 5.26 | 1.09 | 7.32 |

TABLE 3

Experimental Conditions: 1490° C. at 10 minute residence time

| Feedstock | Weight-Grams | | | Metallic Slab density g/cm³ |
|---|---|---|---|---|
| | Loose Powder | Metallic Slab | Slag | |
| 65% Fe Fluxed Concentrate, Dried Sugar beet Waste Reductant | 12.2 | 4.83 | 1.22 | 6.67 |

TABLE 4

Experimental Conditions: 1490° C. at 10 minute residence time

| Feedstock | Weight-Grams | | | Metallic Slab density g/cm³ |
|---|---|---|---|---|
| | Loose Powder | Metallic Slab | Slag | |
| 58% Fe Fluxed Concentrate, 50% Hardwood, 50% Coal Reductant | 12.1 | 4.02 | 2.75 | 7.12 |

TABLE 5

Experimental Conditions: 1490° C. at 12 minute residence time

| Feedstock | Weight-Grams | | Metallic Slab density g/cm³ |
|---|---|---|---|
| | Loose Powder | Metallic Slab + Slag[(1)] | |
| 59.30% FE 7.90% $T_1O_2$ beach sand Concentrate, Hardwood reductant, burnt CaO flux | 12 | 8.72 | n.a. |

[(1)]Remarks: Slag would not separate from metal slab

TABLE 6

Experimental Conditions: 1490° C. at 15 minute residence time

| Feedstock | Weight-Grams | | | Metallic Slab density g/cm³ |
|---|---|---|---|---|
| | Loose Powder | Metallic Slab | Slag | |
| 59.30% FE 7.90% $T_1O_2$ beach sand concentrate, Hardwood reductant, burnt CaO flux | 12 | 4.82 | 3.09 | 7.3 |

Metal and slag were separated by dropping into water while still red hot. Thermal shock broke most of the slag free of the metal. Slag removal would have required hammering otherwise. Surface of the metal was clean and nearly white, rather than being coated with a grey oxide.

The metallic slab produced in Example Nos. 1, 2 and 4, had a mean apparent density of 7.28. This is denser than iron nuggets produced using mixtures of iron ore concentrates with powdered coal as the reductant, and is comparable to pig iron produced in the blast furnace. Cast pig iron has a density of about 7.2.

Based on the successful laboratory test program, pilot plant tests were conducted, on a 24 hour per day schedule, utilizing an electric linear pusher type furnace. Experimental Conditions: 1490° C. at 10 to 24 minute residence times. The tests were conducted at a facility owned by Tundra Technologies, White Bear Lake, Minn. The furnace was a Model 10-008-19B, manufactured by CM Furnace Company, approximately 26 feet long and consisted of pre-heat and heating zones, a high temperature reduction zone and a cooling zone. Nine thermocouples measured the temperature in the above zones.

Three different iron ore concentrates and three different types of biomass were tested in the linear furnace. Tests were conducted with feedstock in the form of briquettes containing iron concentrate, flux, reductant and a molasses binder.

Comparative tests were also conducted with a feedstock mixtures of iron ore concentrates, flux, and biomass but without a binder, in the "loose" or un-agglomerated powder form.

A loose, un-agglomerated mixture of iron ore concentrates containing 58% iron and 13% silica, limestone/dolomite flux and 40×0 mesh hardwood reductant were placed as a loose, un-agglomerated mixture. The mixture was placed on a 1½ inch, thick bed of 10×0 mesh anthracite coal in 4.5 inch wide by 10 inch long by 3 inch deep alumina silicate boats, as shown in FIG. 5.

The reduction process was tested at different feed rates to determine the effect on the quality of metallic slabs produced. The reduction process used electric furnace technology and controls to achieve peak reduction temperatures of 1490° C. for 20 to 24 minutes.

Metallic slabs were produced with an average density of approximately 7.2 grams per cubic centimeter. Chemical analyses for this test series averaged approximately 98.4% Fe, 0.9% C, 0.014% MN, 0.035% P and >=0.42% S based on spectrometer analyses. Most steel grades range from about 0.08% to 0.55% carbon but grade 1080 to 1095 steel ranges from 0.72% carbon to 1.05% carbon.

The excess biomass produces a synthetic gas which can be used as fuel to produce electricity or to fuel the process that will provide part of the energy required in the process.

Production of Direct Reduced Iron (DRI) by Utilizing Wood as the Reducing Agent

A fluxed Magnetite concentrate containing 63% Fe, 6.2% limestone/dolomite and 2% silica was utilized as the iron source, 30×0 mesh softwood was used as the reducing agent together with a wheat flour binder. A composition containing 80% fluxed iron concentrate, 18% softwood and 2% binder was formed into pellets.

The biomass pellets were fired at furnace temperatures of 4 to 30 minutes at furnace temperatures that were varied from 900° C. to 1300° C.

The resulting DRI samples were ground and analyzed for X-ray diffraction (XRD) pattern.

XRD results are shown in FIGS. 9, 10, 11, 12, and 13 representing X-ray diffraction patterns of magnetite concentrate (as received), and pellets fired at furnace temperature 900° C., 1000° C., 1100° C., and 1300° C. The summary of the XRD results is shown in Table 1. The XRD of magnetite concentrate can be compared with XRD of pellets (fired at temperature 900, 1000, and 1100° C.) for magnetite peaks as the pellets were made using magnetite. Magnetite peaks keep appearing in XRD graph even when pellets were fired at temperature 1100° C. for 30 minutes, which indicates that either the magnetite was never reduced to metallic iron or after removing the DRI sample from the furnace, it re-oxidized to magnetite.

TABLE 5

XRD results of magnetite concentrate and biomass pellets (80% magnetite/18% softwood/2% wheat flour) fired at temperature 900, 1000, 1100 and 1300° C.

| Pellet's Composition | Furnace Temp ° C. | Residence Time, min | XRD Results |
|---|---|---|---|
| Magnetite Concentrate | — | | Magnetite Peaks were present |
| 80% Magnetite/ 18% Softwood/ 2% Wheat flour | 900 | 5 | Magnetite Peaks were present |
| | 1000 | 30 | Magnetite Peaks were present |
| | 1100 | 30 | Magnetite Peaks were present |
| | 1300 | 4 | Only 3 peaks showed up in the XRD and none of these 3 peaks belong to iron oxides ($Fe_3O_4$, $Fe_2O_3$, and FeO) |

Iron oxide is dissolved in hydrochloric acid (HCl) but carbon is not dissolved in HCl. The direct reduced iron (DRI) sample can be digested in HCl and in case where magnetite was never reduced, un-reacted carbon can be seen in the acid as black residue in the beaker. In order to determine if magnetite was reduced at all, the DRI sample (pellets fired at temperature 1300° C.) was digested in HCl acid to see if there was any black residue and there was no un-dissolved black residue observed. It indicated the magnetite did reduce to metallic iron consuming all the carbon present in softwood (reducing agent) and that is why there was no un-dissolved black residue was observed in the acid. When pellets were fired at temperature 1300° C. for residence time 4 minutes, only three peaks appeared in the DRI samples and these peaks were neither magnetite nor hematite nor wustite (FeO), shown in FIG. 5. Appearance of no iron oxide peaks indicated that when pellets were fired at temperature 1300° C. to produce DRI, reduced magnetite did not re-oxidize after removal from the furnace, and produced a more stable DRI compound.

Accordingly, it has also been found that direct reduced iron can produced by utilizing biomass pellets composed of 80% of magnetite concentrate (as iron source), 18% of softwood (as reducing agent), and 2% of wheat flour (as binder) at furnace temperature 1300° C. and residence time 4 minutes. In XRD of the DRI sample produced at temperature 1300° C. and for residence time 4 minutes, no magnetite, hematite and wustite peaks appeared, this indicates that iron was present in the form of metallic iron instead of iron oxide.

Magnetite+biomass pellets fired at 900, 1000 and 1100° C. at resident times of 5 to 30 minutes all showed magnetite peaks, which indicate that the magnetite was not fully converted to direct reduced metallic iron.

The sample processed at 1300° C. for a residence time of 4 minutes, showed no magnetite peaks, which showed that the magnetite was converted to direct reduced iron (DRI) and did not oxidize after removal from the furnace.

In conclusion, it has been found that direct reduced iron can be produced by utilizing biomass as the reducing agent. Pellets composed of 80% fluxed iron ore concentrate, 18% softwood (reducing agent) and 2% wheat flour (binder) processed at a furnace temperature of 1300° C. for a residence period of 4 minutes produced a direct reduced iron product with virtually all of the iron present in the form of metallic iron instead of iron oxide.

A direct reduced iron can also be produced by utilizing biomass as the reducing agent, without briquetting or pelletizing, but in a loose or non-agglomerated form by placing the above mixture in a furnace at 1300° C. for a residence time of 4 minutes.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A method of producing metallic iron, comprising:
   (a) providing an amount of iron oxide ore material at least a portion of which is selected from the group consisting of magnetite, hematite, goethite, limonite, mill scale, and a mixture thereof;
   (b) blending the ore material with biomass reductant and a suitable flux material to form a mixture; and
   (c) placing the mixture in a loose uncompacted or slightly compacted form, but wherein the mixture remains in an un-agglomerated state into a reducing furnace, wherein the reducing furnace has an atmosphere substantially devoid of oxygen, wherein the furnace atmosphere temperature is from about 1260° C. to about 1550° C., for a time and at a temperature sufficient to thereby produce metallic iron.

2. A method of producing metallic iron according to claim 1 wherein furnace temperature is about 1490° C. and the time is a period of about 5 to about 15 minutes.

3. A method of producing metallic iron according to claim 2, wherein the time is about 10 minutes.

4. A method of producing metallic iron according to claim 1 wherein the biomass is in a natural, non-charred, non-torrified product containing from 2 to 30wt % moisture.

5. A method of producing metallic iron, according to claim 1 wherein the biomass is selected from the group consisting of wood and woody material.

6. A method of producing metallic iron according to claim 1, wherein the biomass is selected from the group consisting of sugar beet waste, corn stocks, corn stover, corn cobs, wheat straw, bagasse, copra, switch grass, other grasses and mixtures thereof.

7. A method of producing metallic iron according to claim 1, where an excess biomass of at least 2 to 4 percent of biomass, above the stoichiometric amount required for the reduction of the iron oxide ore material to metallic iron, is provided in the mixture.

8. A method of producing metallic iron according to claim 7 including using the excess biomass in the reducing furnace to produce an excess amount of CO and H, above an amount of CO and H required to reduce the iron oxides to metallic iron.

9. A method of producing metallic iron, according to claim 8, including extracting the hot excess CO and H in the form of syngas from the furnace, cleaning, and using the syngas as a heat source for generating electric power.

10. A method of producing metallic iron according to claim 8, including extracting the hot excess CO and H in the form of syngas from the furnace, cleaning and using the syngas as a heat source to be used to supply heat in the reducing furnace.

11. A method of producing metallic iron according to claim 1, wherein the metallic product is in a form selected from the group consisting of slabs, nuggets, pellets and granules and has a metallic iron content of from 90 to 98wt % iron and a carbon content of 0.5 to 3.0wt %.

12. A method of producing metallic iron according to claim 1, wherein the temperature is controlled at approximately 1490° C. for a reduction period of about 10 minutes in a reducing atmosphere created by the reduction of the biomass to CO and $H_2$, and wherein the resulting product is steel slabs or nuggets that contain about 98wt % iron and 1.0wt % or less carbon.

13. A method of producing metallic iron according to claim 1, whereby the temperature is controlled at approximately 1490° C. for a reduction period of about 10 minutes in a neutral or reducing atmosphere including the introduction of nitrogen or natural gas into the furnace, and the resulting product is a steel slab that contains about 96-98% (wt) iron and 1 to 3% (wt) carbon.

14. A method of producing metallic iron according to claim 1 including providing a bedding material beneath the mixture of ore material, biomass and flux.

15. A method of producing metallic iron according to claim 14 wherein the bedding material is selected from the group consisting of anthracite coal, petroleum coke, bituminous coal, sub-bituminous coal, lignite coal, wood and wood char.

16. A method of producing metallic iron, according to claim 1, wherein the reducing furnace is a linear furnace.

17. A method of producing metallic iron, according to claim 1, wherein the reducing furnace is a rotary grate furnace.

18. A method of producing metallic iron containing manganese comprising:
(a) providing a manganiferous ore or concentrate, containing iron oxides and manganese oxides with biomass reductant and a limestone/dolomite flux to form a mixture thereof;
(b) placing the mixture in a loose, un-aggiomerated, un-briquetted or unpelletized form into a heating furnace where the furnace conditions are substantially devoid of oxygen; and
(c) heating the mixture to a temperature from about1450° C. to about 1550° C. and for a time sufficient to produce metallic iron containing manganese.

19. A method of producing metallic iron that contains manganese from a manganiferous ore, according to claim 18 wherein the biomass reductant is selected from the group of biomass materials consisting of wood, woody products, sugar beet waste, switch grass, corn stover and bagasse.

20. A method of producing metallic iron nuggets or slabs that contain manganese from a manganiferous ore according to claim 18, wherein the reductant comprises a coal or coke.

21. A method of producing manganese rich iron nuggets or manganese rich slab according to claim 20 wherein the flux comprises material selected from the group consisting of a 50wt % limestone, 50wt % dolomite mixture and slaked lime.

22. A method of producing a manganese rich slag and a manganese poor, iron rich metallic iron nugget or slab according to claim 18 wherein the reductant is selected from a group of biomass materials consisting of wood, woody products, sugar beet waste, bagasse, switch grass and other grasses that are essentially free of free carbon.

23. A method of producing metallic iron containing manganese comprising:
(a) providing a manganiferous ore or concentrate, containing iron oxides and manganese oxides with a biomass reductant and a limestone/dolomite flux to form a mixture thereof;
(b) placing the mixture in an agglomerated, briquetted or pelletized form into a heating furnace where the furnace conditions are substantially devoid of oxygen; and
(c) heating the mixture to a temperature and for a time sufficient to produce metallic iron containing manganese.

24. A method as in claim 23, wherein the furnace temperature is from about 1450° C. to 1550° C.

25. A method of producing metallic iron that contains manganese from a manganiferous ore, according to claim 23 wherein the biomass reductant is selected from the group of biomass materiels consisting of wood, woody products, sugar beet waste, switch grass, corn stover and bagasse.

26. A method of producing metallic iron nuggets or slabs that contain manganese from a manganiferous ore according to claim 23, wherein the reductant comprises a coal or coke.

27. A method of producing a manganese rich slag and a manganese poor, iron rich metallic iron nugget or slab according to claim 23 wherein the biomass reductant is selected from the group of biomass materials consisting of wood, woody products, sugar beet waste, bagasse, switch grass and other grasses that are essentially free of free carbon.

28. A method of producing manganese rich iron nuggets according to claim 23 or manganese rich slag wherein the flux comprises material selected from the group consisting of a 50wt % limestone, 50wt % dolomite mixture and slaked lime.

29. A method of producing a manganese rich slag and a manganese poor iron nugget or slab from a mixture of manganiferous ore, reductant and flux by subjecting the mixture to a furnace temperature established below 1400° C., to produce a manganese poor iron slab or nugget and a slag; the manganese being caused to flow or migrate into and become part of the slag thereby forming a manganese rich slag.

* * * * *